(No Model.)
P. HARVEY.
STOP AND WASTE VALVE.
No. 331,789. Patented Dec. 8, 1885.
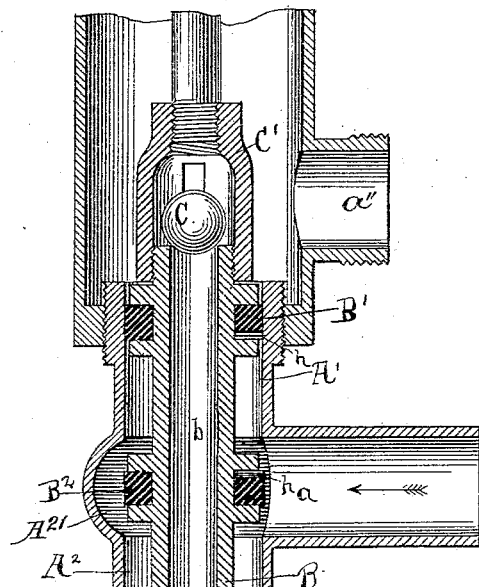
Witnesses:
Frank J. Blanchard
W. L. Parker
Inventor:
Patrick Harvey
By Chas. S. Burton
Attorney.

United States Patent Office.

PATRICK HARVEY, OF CHICAGO, ILLINOIS.

STOP AND WASTE VALVE.

SPECIFICATION forming part of Letters Patent No. 331,789, dated December 3, 1885.

Application filed January 26, 1885. Serial No. 153,934. (No model.)

*To all whom it may concern:*

Be it known that I, PATRICK HARVEY, a citizen of the United States, residing at Chicago, in the county of Cook and State of Illinois, have invented certain new and useful Improvements in Stop and Waste Valves, which is fully set forth in the following specification.

This invention is an improvement upon certain stop and waste valves in which piston-valves are employed to control the supply and waste flow, said valves being made rigid with a common stem, and so moving together both in opening and closing, and seating in cylindrical seats between the several ports through which supply and waste water is admitted and discharged; and it particularly relates to the devices of this class in which the packing of the said piston-valves is in the form of a gasket or annulus of rubber or similar flexible material held between suitable rigid flanges and forming the periphery and seating surface of the valve.

When the arrangement of parts in such devices is such that the flow of the current of the fluid, whether supply or waste, which either valve cuts off is in the direction the reverse of that in which the valve moves to cut it off, that current, directed thus against the side of the gasket which is about to enter the valve-seat, tends to force out the corner or edge of the gasket, and cause it to engage against the edge of the valve-seat, and become torn or distorted as it is further forced into its seat. This difficulty I remove by so arranging the several valves and ports that the currents, both supply and waste, flow in the same direction as the valves respectively move to cut off such flow—that is, so that the valves seat with the current instead of against it.

In the drawings, Figure 1 is a vertical section of my improved valve. Figs. 2 and 3 are enlarged sectional details of a valve and its seat, showing the action of the currents upon the annular packing, the former when the valve seats against the current, and the latter when it seats with the current.

A is the valve-shell having the supply-port $a$, the service-port $a'$, and the waste-port $a''$, and the return-passage $a'''$ from the service-pipe to the shell-chamber. B is the valve-stem bearing four (4) piston heads or valves, $B'$, $B^2$, $B^3$, and $B^4$. The first, $B'$, never leaves its seat $A'$, but plays the length of it only. $B^2$ closes the supply-port—i. e., cuts off communication from it to the service-port—by seating in the seat $A^2$, and stands, when out of its seat, in the enlarged cavity $A^{21}$. $B^3$ never leaves the seat $A^3$, but plays the length of it only. $B^4$ closes the waste-port—i. e., cuts off communication from it to the waste-duct $b$—by seating in the seat $A^3$, and stands, when out of its seat, in the enlarged cavity $A^{31}$.

In the highest position of the stem the valves $B^3$ and $B^4$ are both on the seat $A^3$, and the valve $B^2$ is out of its seat, and communication is free between the supply and service ports. When the stem is depressed, the valve $B^2$ first becomes seated and cuts off the supply from the service-port. The stem being further depressed, the valve $B^2$ becomes further seated, and the valve $B^4$ leaves its seat $A^3$, admitting water from the service-pipes by way of the return-passage $a'''$ and the annular space $b''$, through the waste-orifice $b^2$ into the waste-duct $b$, whence it passes out past the check-valve C through the cage $C'$ and the waste-port $a''$, into the sewer. It will be seen that the valve $B^2$ in closing moves with the current of water which it cuts off, so that its gasket $g^2$ will have its lower edge compressed, as illustrated in Fig. 3, by the pressure as it nears its seat, so assisting it to enter, whereas if the flow and pressure were in the reverse direction it would strike the side instead of the face or rim of the gasket, and tend to throw the corner out, as illustrated in Fig. 2, and cause it to collide with the edge of its seat and be torn or wrenched. The same will be seen to be true of the valve $B^4$, if, after opening it and cutting off the supply, and while the service-pipes are still discharging through the waste-port, it be closed. It will be obvious, therefore, that the accomplishment of the purpose of the invention depends upon causing the valve which cuts off the communication between the supply and service ports, and the valve which cuts off communication between the service and waste ports both to move, in entering their seats, with the currents which they respectively cut off when seated, and that since both valves are rigid on one and the same stem, and hence move simultaneously—the one to enter and the other to leave its seat—the motion of said stem in one direction seating one valve and its motion in the other direction seating the other, the result stated is due to the fact that the pair of cavities in which said valves respectively stand when out of their seats, and the said pair of seats form the one pair, the extremes, and the other pair the means, of a series. In the form shown in the drawings the cavities are the extremes and the seats are the means, but the reverse arrangement, corresponding changes being made in the other parts, would effect the purpose and be within the scope of my invention.

I do not herein claim, generically, the combination of the waste-duct through the stem with the several valves and ports, having made such claim in my pending application, No. 149,243, filed December 1, 1884; but

I claim—

1. In combination, substantially as hereinbefore set forth, the valve-shell having cylindrical valve-seats and enlarged cavities adjacent thereto, and supply, service, and waste ports communicating through such seats and cavities, and the valve-stem having piston-valves rigid with it, closing such communication when in their seats, respectively, and standing in such enlarged cavities when out of their seats, the seat through which the supply and service ports communicate and the seats through which the service and waste ports communicate being respectively on opposite sides of the enlarged cavities in which said valves respectively stand when out of their seats.

2. In combination, substantially as hereinbefore set forth, the valve-shell having cylindrical valve-seats and enlarged cavities adjacent to said seats, and supply, service, and waste ports communicating through such seats and cavities, and the valve-stem having within it the waste-duct communicating with the service-port and the waste-port, and having piston-valves rigid with it, closing the said communication between said ports when in their seats, respectively, and standing in said enlarged cavities when out of their seats, the seat through which the supply and service ports communicate and the seat through which the service-port communicates with the waste-duct being respectively on opposite sides of the enlarged cavities in which the valves respectively stand when out of their seats.

In testimony whereof I have hereunto set my hand, in the presence of two witnesses, at Chicago, Illinois, this 10th day of January, A. D. 1885.

PATRICK HARVEY.

Attest:
  CHAS. S. BURTON,
  G. W. FLEMING.